United States Patent
Yang

(10) Patent No.: US 9,128,731 B2
(45) Date of Patent: Sep. 8, 2015

(54) COMMUNICATION BETWEEN A MOBILE COMPUTING DEVICE AND AN ACCESSORY DEVICE USING A RECONFIGURABLE ACCESSORY COMMUNICATION PROTOCOL

(71) Applicant: Sheng-Long Yang, Taipei (TW)

(72) Inventor: Sheng-Long Yang, Taipei (TW)

( * ) Notice: Subject to any disclaimer, the term of this patent is extended or adjusted under 35 U.S.C. 154(b) by 0 days.

(21) Appl. No.: 13/788,133

(22) Filed: Mar. 7, 2013

(65) Prior Publication Data
US 2014/0258562 A1    Sep. 11, 2014

(51) Int. Cl.
| | |
|---|---|
| G06F 3/00 | (2006.01) |
| G06F 9/44 | (2006.01) |
| G06F 3/02 | (2006.01) |
| H04M 1/725 | (2006.01) |

(52) U.S. Cl.
CPC ............ *G06F 9/4411* (2013.01); *G06F 3/0219* (2013.01); *G06F 3/0227* (2013.01); *H04M 1/72527* (2013.01); *H04M 1/7253* (2013.01); *H04M 2250/02* (2013.01)

(58) Field of Classification Search
CPC combination set(s) only.
See application file for complete search history.

(56) References Cited

U.S. PATENT DOCUMENTS

| | | | |
|---|---|---|---|
| 7,130,895 B2 * | 10/2006 | Zintel et al. | 709/220 |
| 7,337,402 B2 * | 2/2008 | Milton et al. | 715/730 |
| 8,001,274 B2 * | 8/2011 | Srinivasan et al. | 709/246 |
| 8,856,297 B2 * | 10/2014 | Yuki | 709/223 |
| 2010/0267376 A1 * | 10/2010 | Saari et al. | 455/418 |
| 2012/0271967 A1 * | 10/2012 | Hirschman | 710/8 |

* cited by examiner

*Primary Examiner* — Tammara Peyton
(74) *Attorney, Agent, or Firm* — Dickstein Shapiro LLP

(57) ABSTRACT

In a method of controlling an accessory device by a mobile computing device, upon being communicatively coupled with the accessory device, the mobile computing device communicates with the accessory device using an accessory communication protocol to receive accessory information, and protocol configuration data associated with a specific application executable on the accessory device. The mobile computing device reconfigures the accessory communication protocol based on the protocol configuration data to obtain a reconfigured accessory communication protocol, and then communicates with the accessory device using the reconfigured accessory communication protocol to control execution of basic functionality and the specific application on the accessory device.

3 Claims, 2 Drawing Sheets

COMMUNICATION BETWEEN A MOBILE COMPUTING DEVICE AND AN ACCESSORY DEVICE USING A RECONFIGURABLE ACCESSORY COMMUNICATION PROTOCOL

BACKGROUND OF THE INVENTION

1. Field of the Invention

The invention relates to communication between a mobile computing device and an accessory device, and more particularly to communication between a mobile computing device and an accessory device using a reconfigurable accessory communication protocol.

2. Description of the Related Art

Mobile computing devices, such as smart phones, have become popular, and often include web browsers, word processors, email applications, maps, telephone services, games, audio applications, video applications, etc. Moreover, accessory devices have also been created for use with mobile computing devices. Such accessory devices can communicate with a mobile computing device using one or more connectors and/or ports, and can be controlled by the mobile computing device to interact with users.

Generally, a mobile computing device may communicate with an accessory device to execute basic control functions of the accessory device, such as power control and data retrieve, using an accessory communication protocol provided by the mobile computing device. However, such an accessory communication protocol may not be supported by the accessory device to execute some specific applications. In order for the mobile computing device to control execution of the specific applications on the accessory device, it is necessary for the mobile computing device to modify the accessory communication protocol or download one or more specific application protocols/accessory communication protocols to be supported by the mobile computing device and the accessory device, thereby resulting in inconvenience during use.

Therefore, there is still room for improvements in the above techniques.

SUMMARY OF THE INVENTION

Therefore, an object of the present invention is to provide a method of controlling an accessory device by a mobile computing device that can overcome the aforesaid drawbacks of the prior art.

According to one aspect of the present invention, there is provided a method of controlling an accessory device by a mobile computing device. The method of this invention comprises the steps of:

a) establishing a communication link between the mobile computing device and the accessory device;

b) communicating, by the mobile computing device, with the accessory device using an accessory communication protocol to allow the mobile computing device to receive from the accessory device accessory information that indicates identity of the accessory device and that is related to basic functionality of the accessory device, and protocol configuration data, the protocol configuration data being associated with at least one specific application that is executable on the accessory device;

c) reconfiguring, by the mobile computing device, the accessory communication protocol based on the protocol configuration data to obtain a reconfigured accessory communication protocol that is supported by the mobile computing device and by the accessory device; and d) communicating, by the mobile computing device, with the accessory device using the reconfigured accessory communication protocol to allow the mobile computing device to control execution of the basic functionality of and the at least one specific application on the accessory device.

According to another aspect of the present invention, there is provided a computer readable medium containing program instructions that, when executed by a processor of a mobile computing device, cause the processor to execute a method comprising:

in the event that an accessory device is communicatively coupled with the mobile computing device, communicating with the accessory device using an accessory communication protocol to receive from the accessory device accessory information that indicates identity of the accessory device and that is related to basic functionality of the accessory device, and protocol configuration data, the protocol configuration data being associated with at least one specific application that is executable on the accessory device;

reconfiguring the accessory communication protocol based on the protocol configuration data to obtain a reconfigured accessory communication protocol that is supported by the mobile computing device and by the accessory device; and communicating with the accessory device using the reconfigured accessory communication protocol to control execution of the basic functionality of and the at least one specific application on the accessory device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
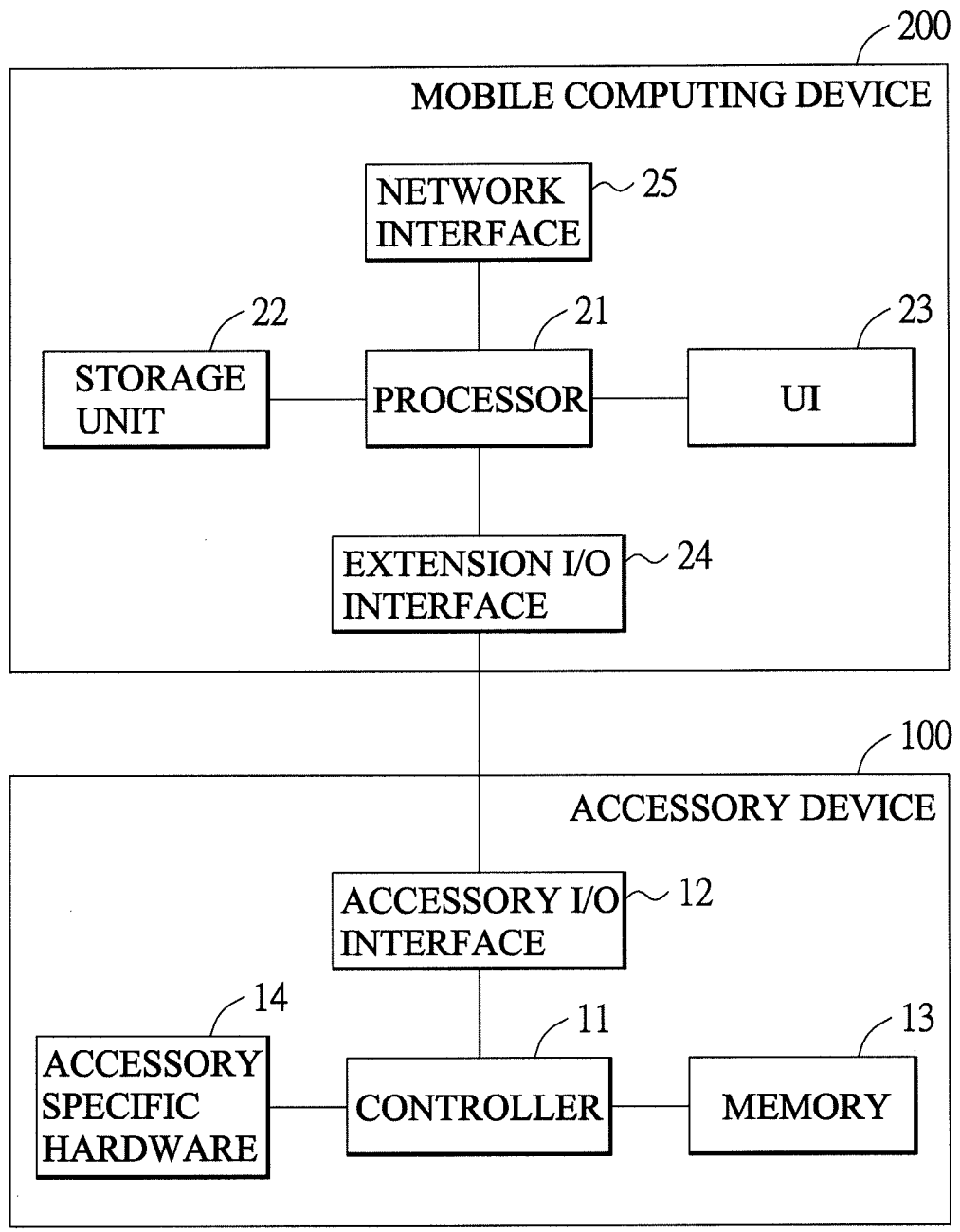
FIG. 1 is a schematic block diagram illustrating a mobile computing device coupled with an accessory device according to one embodiment of the present invention.

FIG. 1 shows a schematic block diagram of a mobile computing device 200 coupled with an accessory device 100 according to one embodiment of the present invention.

The mobile computing device 200, such as a smart phone, can provide media player capability, networking, web browsing, email, wording processing, data storage, application execution, and/or any other computing or communication functions. The mobile computing device 200 can include a processor 21, a storage unit 22, a user interface (UI) 23, an extension input/output (I/O) interface 24, and a network interface 25. The processor 21 can control operation of the mobile computing device 200. For example, in response to user input signals provided by the UI 23, the processor 21 can perform various tasks, such as: playing media assets; accessing various networks (e.g., a mobile telephone network, the Internet, a local area network, or the like) to send and/or retrieve data via the network interface 25; executing various application programs (Apps) residing in the storage unit 22; etc. The processor 21 can also manage communication with the accessory device 100 via the extension I/O interface 24. The storage unit 22 can store the Apps, system programs and various data. The UI 23 can include input devices, such as a touch pad, a touch screen, buttons, a keypad, a microphone, etc., as well as output devices, such as a display screen, indicator lights, speakers, a headphone jack, etc. A user can operate the various input devices of the UI 23 to invoke the functionality of the mobile computing device 200 and can also view and/or hear output from the mobile computing device 200 via the output devices of the UI 23. In one embodiment, the extension I/O interface 24 can include a connector for providing a number of signal paths configured to carry various signals between the mobile computing device 200 and the accessory device 100. Alternatively, the extension I/O interface 24 can include a wireless interface (e.g., Bluetooth or the like). The network interface 25 can provide an interface to one or more communication networks, such as a mobile telephone network, the Internet, a personal area network (e.g., a Bluetooth network), etc.

The accessory device 100 can be any device capable of communicating with the mobile computing device 200, such as an external video device, a multimedia device, a consumer electronic device, etc. The accessory device 100 can include a controller 11, an accessory I/O interface 12, a memory 13, and an accessory specific hardware 14. In one embodiment, the accessory I/O interface 12 can include a connector matable with the connector of the extension I/O interface 24 of the mobile computing device 200. Alternatively, the accessory I/O interface 12 can include a wireless interface (e.g., Bluetooth or the like). The controller 11 can perform various functions of the accessory device 100 and control the functionality of the accessory device 100. The controller 11 can also manage communication with the mobile computing device 200 via the accessory I/O interface 12. The memory 13 can store program codes for the controller 11 and data, such as accessory information that indicates identity of the accessory device 100 and that is related to basic functionality of the accessory device 100. It is noted that, in this embodiment, the memory 13 further stores protocol configuration data associated with at least one specific application executable on the accessory device 100. The accessory specific hardware 14 can be any hardware needed to enable the functionality of the accessory device 100.

Figure 2:
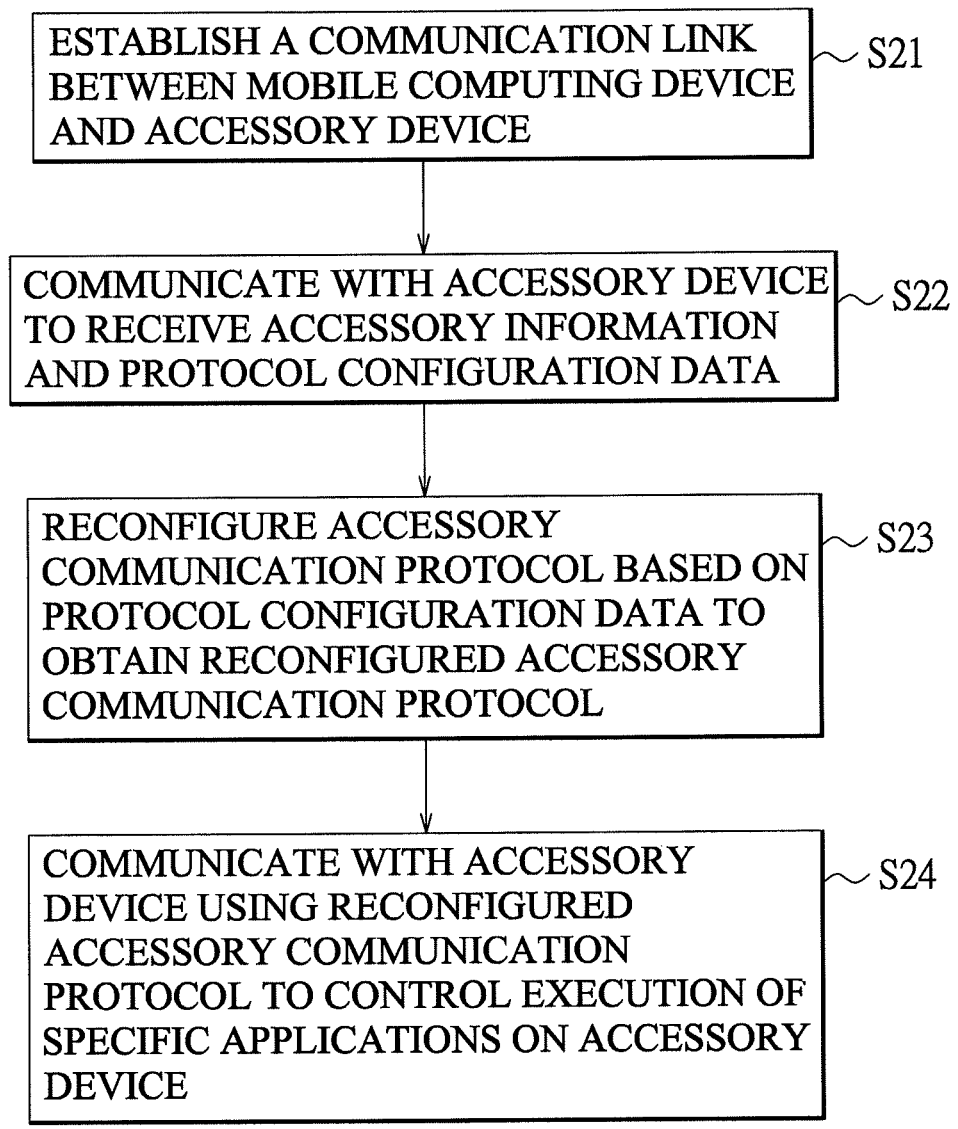
FIG. 2 is a flow chart illustrating a preferred embodiment of a method of controlling an accessory device by a mobile computing device according to the present invention.

FIG. 2 is a flow chart illustrating the preferred embodiment of a method of controlling an accessory device 100 by a mobile computing device 200 according to the present invention.

In step S21, a communication link between the mobile computing device 200 and the accessory device 100 is established. For example, in the event that the connector (not shown) of the accessory device 100 is physically coupled with the connector (not shown) of the extension I/O interface 24 of the mobile computing device 200 or that the accessory device 100 is wirelessly coupled with the mobile computing device 200 via, for example, a Bluetooth network or the Internet, the communication link can be considered as being established whenever a wired or wireless communication channel between the mobile computing device 200 and the accessory device 100 is open.

In step S22, the processor 21 of the mobile computing device 200 communicates with the controller 11 of the accessory device 100 using an accessory communication protocol to allow the processor 21 of the mobile computing device 200 to receive from the accessory device 100 the accessory information and the protocol configuration data that is associated with the at least one specific application executable on the accessory device 100. In this embodiment, the accessory communication protocol can be a communication protocol generic to the mobile computing device 200 and the accessory device 100. It is noted that the controller 11 of the accessory device 100 may encrypt and/or compress the protocol configuration data prior to transmission of the same to the mobile computing device 200. Thus, if the protocol configuration data encrypted and/or compressed by the controller 11 of the accessory device 100 is transmitted to the mobile computing device 200, the protocol configuration data received by the mobile computing device 200 should be decrypted and/or decompressed by the processor 21 of the mobile computing device 200 prior to subsequent processing.

In step S23, the processor 21 of the mobile computing device 200 is operable to reconfigure the accessory communication protocol based on the protocol configuration data to obtain a reconfigured accessory communication protocol that is supported by both the mobile computing device 200 and the accessory device 100. In this embodiment, the protocol configuration data is a packetized extensible markup language (XML) document. Thus, the processor 21 of the mobile computing device 200 is configured to parse the protocol configuration data based on XML syntax to define at least one UI action and/or at least one non-UI action, and at least one UI component corresponding to the at least one UI action. The at least one UI action, the at least one non-UI action and the at least one UI component are associated with the at least one specific application. Then, the UI component is rendered and displayed on the UI 23 of the mobile computing device 200.

In step S24, the processor 21 of the mobile computing device 200 communicates with the controller 11 of the accessory device 100 using the reconfigured accessory communication protocol to allow the mobile computing device 200 to control execution of the basic functionality (e.g., power control) of and the at least one specific application on the accessory device 100. The specific application is executed in response to one of the non-UI action and the UI action (initiated through user operation of the corresponding UI component displayed on the UI 23).

For example, the mobile computing device 200 is a smart phone and the accessory device 100 is an image capturing device. The following is an example of a parsed XML document serving as the protocol configuration data received by the smart phone.

```
<?xml version="1.0" encoding="ISO-8859-15"?>
<Mode Name=" Preview" >
    <Feature Name=" Image stabilization" >
        <Type>bool</Type>
        <Default>true</Default>
        <Command>0x01dd</Command>
        <Sync type=" poll" >true</Sync>
        <Delay>233</Delay>
    </Feature>
    <Feature Name=" High dynamic range" >
        <Type>int</Type>
        <Min>0</Min>
        <Max>100</Max>
        <Default>0</Default>
        <Command>0x01de</Command>
        <Sync type=" int" >true</Sync>
        <Delay>500</Delay>
    </Feature>
</Mode>
<Mode Name=" Video" >
    <Feature Name=" Image stabilization" >
        <Type>bool</Type>
        <Default>true</Default>
        <Command>0x01dd</Command>
        <Sync type=" poll" >true</Sync>
        <Delay>233</Delay>
    </Feature>
</Mode>
```

In this example, the protocol configuration data is associated with three specific applications: one application is of image stabilization (IS) in a preview mode of the image capturing device; a second application is of high dynamic range (HDR) in the preview mode of the image capturing device; and a third application is of IS in a video mode of the image capturing device. In these applications, the IS can be executed in response to a UI action defined in the protocol configuration data while the HDR can be executed in response to a non-UI action defined in the protocol configuration data.

To sum up, due to the presence of the protocol configuration data associated with the specific applications of the accessory device 100 and pre-stored in the memory 13 of the accessory device 100, the mobile computing device 200 can easily obtain, based on the protocol configuration data from the accessory device 100, the reconfigured accessory communication protocol supported by the mobile computing device 200 and the accessory device 100 without software modification or downloading of any protocol, thereby resulting in convenience during use. Furthermore, the method of the present invention can enable the accessory device 100 to have diversified designs.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of controlling an accessory device by a mobile computing device, said method comprising the steps of:
 a) establishing a communication link between the mobile computing device and the accessory device;
 b) communicating, by the mobile computing device, with the accessory device using an accessory communication protocol to allow the mobile computing device to receive from the accessory device accessory information that indicates identity of the accessory device and that is related to basic functionality of the accessory device, and protocol configuration data, the acquired protocol configuration data being associated with
 at least one specific application that is executable on the accessory device, wherein the acquired protocol configuration data received by the mobile computing device is a packetized extensible markup language (XML) document;
 c) reconfiguring, by the mobile computing device, the accessory communication protocol based on the acquired protocol configuration data to obtain a reconfigured accessory communication protocol that is supported by the mobile computing device and by the accessory device, wherein the packetized XML document is parsed based on XML syntax to define at least one user interface (UI) action and/or at least one non-UI action, and at least one UI component corresponding to the at least one UI action, the at least one UI action, the at least one non-UI action and the at least one UI component being associated with the at least one specific application; and
 d) communicating, by the mobile computing device, with the accessory device using the reconfigured accessory communication protocol to allow the mobile computing device to control execution of the basic functionality of and the at least one specific application on the accessory device.

2. The method as claimed in claim 1, wherein the at least one specific application is executed in response to one of the UI action and the non-UI action.

3. A computer readable medium containing program instructions that, when executed by a processor of a mobile computing device, cause the processor to execute a method comprising:
 in the event that an accessory device is communicatively coupled with the mobile computing device, communicating with the accessory device using an accessory communication protocol to receive from the accessory device accessory information that indicates identity of the accessory device and that is related to basic functionality of the accessory device, and protocol configuration data, the acquired protocol configuration data being associated with at least one specific application that is executable on the accessory device, wherein the acquired protocol configuration data received by the mobile computing device is a packetized extensible markup language (XML) document;
 reconfiguring the accessory communication protocol based on the acquired protocol configuration data to obtain a reconfigured accessory communication protocol that is supported by the mobile computing device and by the accessory device, wherein the packetized XML document is parsed based on XML syntax to define at least one user interface (UI) action and/or at least one non-UI action, and at least one UI component corresponding to the at least one UI action, the at least one UI action, the at least one non-UI action and the at least one UI component being associated with the at least one specific application; and
 communicating with the accessory device using the reconfigured accessory communication protocol to control execution of the basic functionality of and the at least one specific application on the accessory device.

\* \* \* \* \*